US012677060B2

(12) United States Patent
Nakayari

(10) Patent No.: US 12,677,060 B2
(45) Date of Patent: Jul. 7, 2026

(54) CONTROL APPARATUS, CONTROL METHOD, AND STORAGE MEDIUM

(71) Applicant: CANON KABUSHIKI KAISHA, Tokyo (JP)

(72) Inventor: Tatsuya Nakayari, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 140 days.

(21) Appl. No.: 18/497,663

(22) Filed: Oct. 30, 2023

(65) Prior Publication Data

US 2024/0147051 A1 May 2, 2024

(30) Foreign Application Priority Data

Oct. 31, 2022 (JP) ................................. 2022-174742

(51) Int. Cl.
H04N 23/62 (2023.01)
H04N 23/617 (2023.01)
H04N 23/69 (2023.01)
H04N 23/695 (2023.01)

(52) U.S. Cl.
CPC ........... H04N 23/62 (2023.01); H04N 23/617 (2023.01); H04N 23/69 (2023.01); H04N 23/695 (2023.01)

(58) Field of Classification Search
CPC ...... H04N 23/62; H04N 23/617; H04N 23/69; H04N 23/695
See application file for complete search history.

(56) References Cited

U.S. PATENT DOCUMENTS

2014/0267706 A1* 9/2014 Springer .................. H04N 7/18
348/143
2016/0150193 A1* 5/2016 Niida ..................... G03B 37/02
348/143
2022/0164630 A1* 5/2022 Hou ...................... G06N 3/0464

FOREIGN PATENT DOCUMENTS

JP 2012015666 A 1/2012

* cited by examiner

*Primary Examiner* — Christopher K Peterson
(74) *Attorney, Agent, or Firm* — Canon U.S.A., Inc. IP Division

(57) ABSTRACT

A control apparatus includes a generation unit that generates information about a setting window for setting a plurality of preset positions each associated with pan, tilt, and zoom values of an imaging unit, an output unit that outputs the information about the setting window in order to cause a display to display the setting window, a setting unit that sets the plurality of preset positions and order of the plurality of preset positions based on a user operation on the setting window, and a calculation unit that calculates a movement time taken to move an imaging range based on the plurality of preset positions once along a selected route, based on the set plurality of preset positions, the set order of the plurality of preset positions, and the selected route. The selected route is selected by a user from among a plurality of routes for controlling the imaging range.

10 Claims, 11 Drawing Sheets

START

S601
REGISTER PRESET POSITIONS

S602
SET ORDER OF PRESET POSITIONS

S603
SET ROUTES

S604
SET STOP TIMES

S605
SET SPEEDS

S606
SET ACCELERATIONS

S607
CALCULATE MOVEMENT TIME

S608
OUTPUT INFORMATION ABOUT
CALCULATED MOVEMENT TIME

END

FIG.9A

| | EASING | |
|---|---|---|
| | 1 | 2 |
| 1 | (1) | (1, 2) |
| 2 | (2) | (2, 3) |
| 3 | (3) | (3, 4) |

ACCELERATION INFORMATION

FIG.9B

| | PAN/TILT ACCELERATION (DEGREES/s2) | ZOOM ACCELERATION (%/s2) |
|---|---|---|
| 1 | 1 | 1 |
| 2 | 5 | 5 |
| 3 | 10 | 10 |
| 4 | 15 | 15 |

ACCELERATION INFORMATION

CONTROL APPARATUS, CONTROL METHOD, AND STORAGE MEDIUM

BACKGROUND OF THE DISCLOSURE

Field of the Disclosure

The present disclosure relates to a control apparatus, a control method, and a storage medium.

Description of the Related Art

Recently, a technique which enables controlling an imaging range of an imaging apparatus configured to capture images, by controlling at least one of panning, tilting, and zooming of the imaging apparatus has been known. Such an imaging apparatus is also called a pan-tilt-zoom (PTZ) camera. There is also known a technique which registers pan, tilt, and zoom positions in advance as preset positions, and controls the imaging range of the imaging apparatus to go through the registered preset positions.

Japanese Patent Application Laid-Open No. 2012-15666 discusses a method that repeatedly zooms in and out on the imaging range between a first range and a second range, which are imaging ranges specified in advance by a user, thereby repeatedly controlling the imaging range between the specified ranges.

With the method discussed in Japanese Patent Application Laid-Open No. 2012-15666, it is difficult for the user to recognize a time taken to move the imaging range once along a route set for the plurality of preset positions when controlling the imaging range based on the route.

SUMMARY OF THE DISCLOSURE

The present disclosure is directed to a technique for presenting information about a time taken to move an imaging range once along a route set for a plurality of preset positions when controlling the imaging range based on the route.

According to an aspect of the present disclosure, a control apparatus includes a generation unit configured to generate information about a setting window for setting a plurality of preset positions each associated with a pan value, a tilt value, and a zoom value of an imaging unit, an output unit configured to output the information about the setting window in order to cause a display to display the setting window, a setting unit configured to set the plurality of preset positions and order of the plurality of preset positions based on a user operation on the setting window, and a calculation unit configured to calculate a movement time taken to move an imaging range based on the plurality of preset positions once along a selected route, based on the set plurality of preset positions, the set order of the plurality of preset positions, and the selected route, wherein the selected route is selected by a user from among a plurality of routes for controlling the imaging range.

Further features of the present disclosure will become apparent from the following description of exemplary embodiments with reference to the attached drawings.

BRIEF DESCRIPTION OF THE DRAWINGS

FIGS. 9A and 9B are diagrams illustrating an example of acceleration setting.

DESCRIPTION OF THE EMBODIMENTS

Exemplary embodiments of the present disclosure will be described below with reference to the accompanying drawings. Configurations described in the following exemplary embodiments are merely examples and are not limited to the illustrated configurations.

Figure 1:
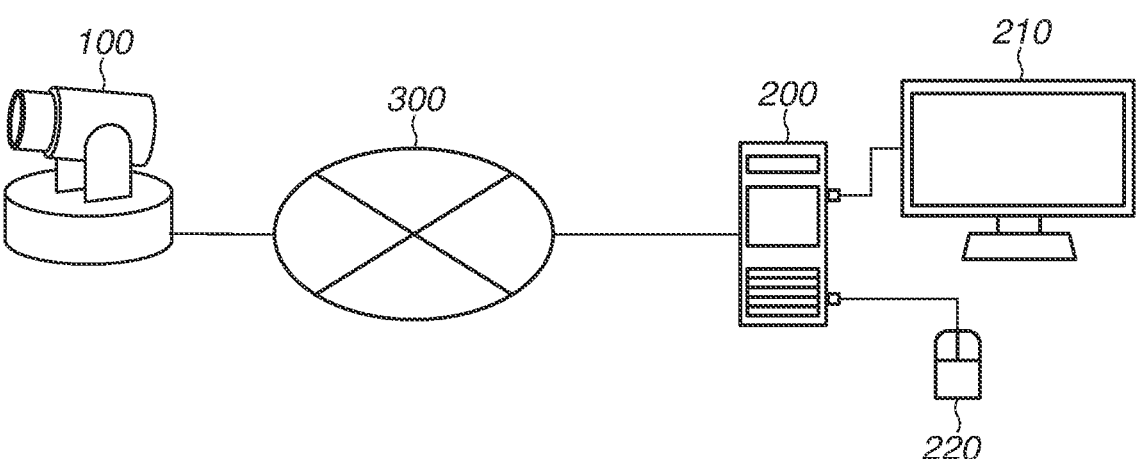
FIG. 1 is a diagram illustrating an example of a system.

FIG. 1 illustrates an example of a configuration of a system according to a first exemplary embodiment. The system according to the present exemplary embodiment includes an imaging apparatus 100, an information processing apparatus 200, a display 210, an input device 220, and a network 300.

The imaging apparatus 100 and the information processing apparatus 200 are interconnected via the network 300. The network 300 is implemented by a plurality of routers, switches, cables, and the like that are compliant with a communication standard, such as Ethernet®.

The network 300 may also be implemented by the Internet, a wired local area network (LAN), a wireless LAN, a wide area network (WAN), or the like.

The imaging apparatus 100 is configured to capture images and functions as a control apparatus capable of controlling an imaging range of the imaging apparatus 100 by controlling (changing) at least one of panning, tilting, and zooming of the imaging apparatus 100. The imaging apparatus 100 transmits image data of the captured images and information about the imaging range of the imaging apparatus 100 to an external apparatus, such as the information processing apparatus 200, via the network 300. The information processing apparatus 200 is, for example, a client apparatus, such as a personal computer, on which programs for implementing functions for processing to be described below are installed.

The display 210 is, for example, a liquid crystal display (LCD) and displays the images captured by the imaging apparatus 100 and other information. The display 210 is connected to the information processing apparatus 200 via a display cable compliant with a communication standard, such as High Definition Multimedia Interface (HDMI®). The display 210 and the information processing apparatus 200 may be provided in a single casing. The input device 220 is used to input an operation to the information processing apparatus 200. In the present exemplary embodiment, a mouse is used as the input device 220.

Figure 2:
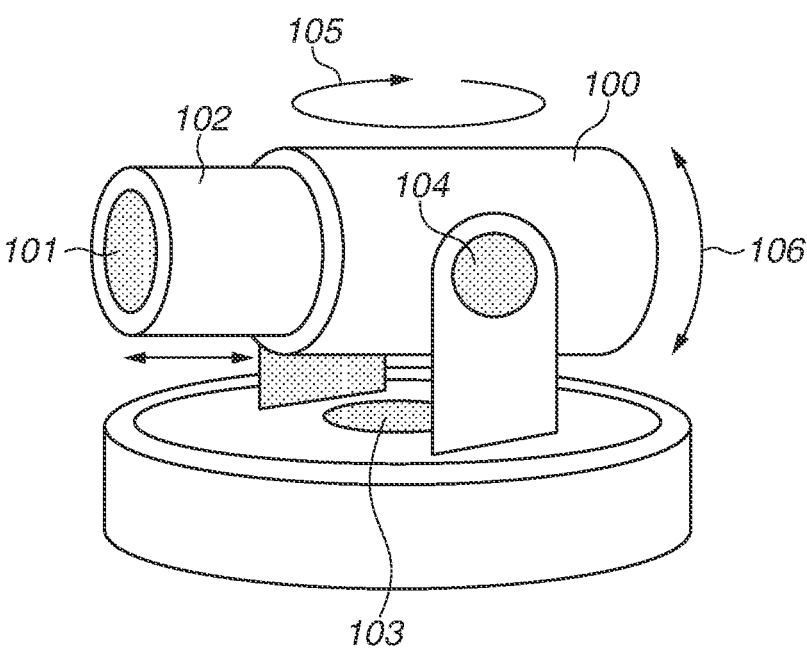
FIG. 2 is a diagram illustrating an example of an external appearance of an imaging apparatus.
Figure 3:
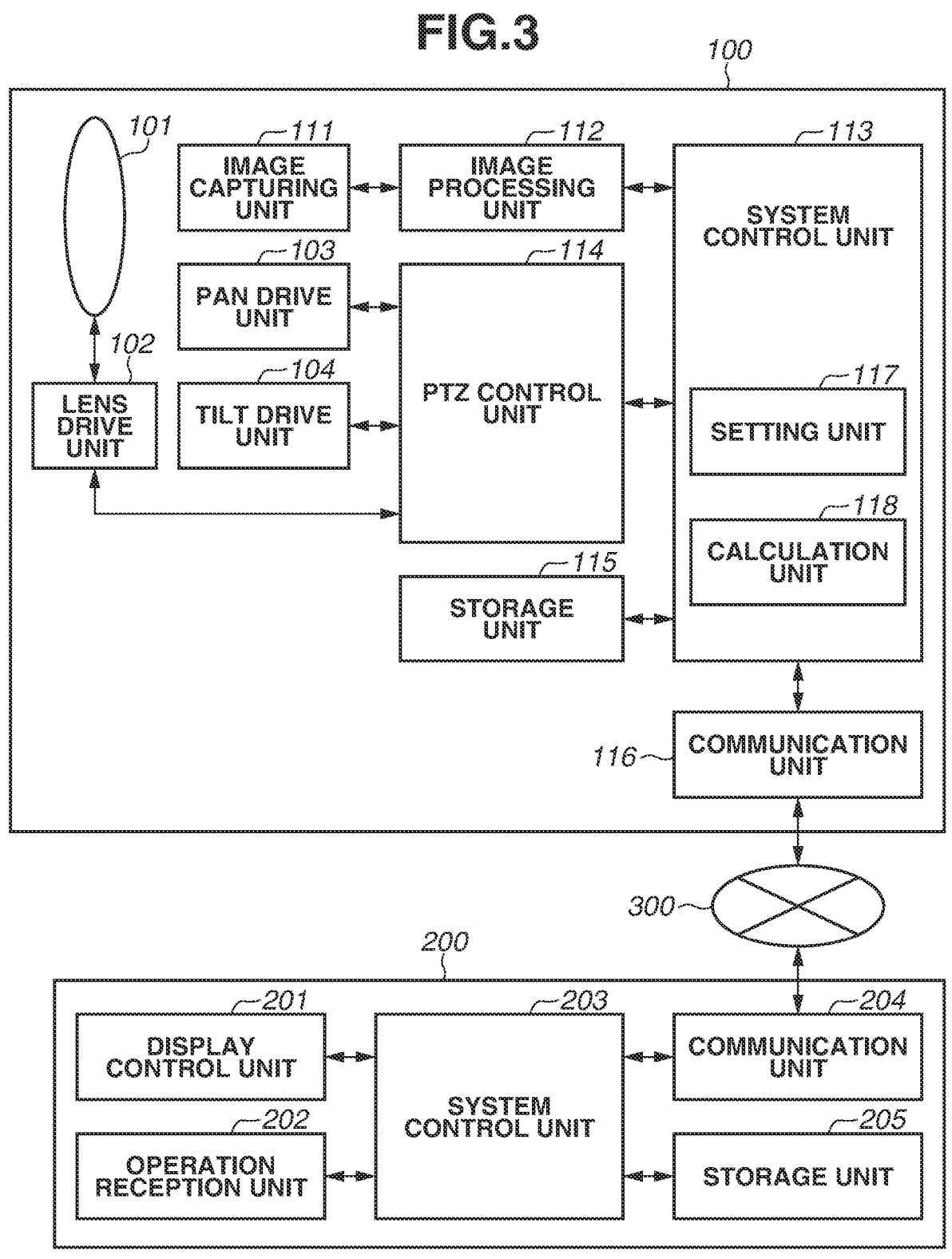
FIG. 3 is a block diagram illustrating functional blocks of the imaging apparatus and an information processing apparatus.

Next, the imaging apparatus 100 according to the present exemplary embodiment will be described with reference to FIGS. 2 and 3. FIG. 2 illustrates an example of an external appearance of the imaging apparatus 100 according to the present exemplary embodiment. FIG. 3 is a block diagram illustrating an example of functional blocks of the imaging apparatus 100 and the information processing apparatus 200 according to the present exemplary embodiment. In the functional blocks of the imaging apparatus 100 illustrated in FIG. 3, functions of an image processing unit 112, a system control unit 113, a pan-tilt-zoom (PTZ) control unit 114, a storage unit 115, a communication unit 116, and the like are implemented by a central processing unit (CPU) 1100 of the imaging apparatus 100 executing computer programs stored in a read-only memory (ROM) 1120 of the imaging apparatus 100, which will be described below with reference to FIG. 11.

An optical axis direction of a lens 101 corresponds to an imaging direction of the imaging apparatus 100. A light beam that has passed through the lens 101 forms an image on an image sensor of an image capturing unit 111 in the imaging apparatus 100. A lens drive unit 102 includes a drive system for driving the lens 101, and can change a focal length of the lens 101. The lens drive unit 102 can also control a focus value of the imaging apparatus 100. The lens drive unit 102 is controlled by the PTZ control unit 114.

A pan drive unit 103 includes a mechanical drive system for controlling the panning, and a motor serving as a drive source. The pan drive unit 103 controls rotational driving for rotationally driving the imaging apparatus 100 in a pan direction 105 as the imaging direction. The pan drive unit 103 is controlled by the PTZ control unit 114.

A tilt drive unit 104 includes a mechanical drive system for controlling the tilting, and a motor serving as a drive source. The tilt drive unit 104 controls rotational driving for rotationally driving the imaging apparatus 100 in a tilt direction 106 as the imaging direction. The tilt drive unit 104 is controlled by the PTZ control unit 114.

The image capturing unit 111 includes the image sensor (not illustrated), such as a charge-coupled device (CCD) sensor or a complementary metal oxide semiconductor (CMOS) sensor. The image capturing unit 111 photoelectrically converts an object image formed by the light beam that has passed through the lens 101, thereby generating an electric signal. The image processing unit 112 performs image processing, such as processing of converting the electric signal generated by the photoelectric conversion in the image capturing unit 111 into a digital signal, and compression encoding processing, and generates image data as captured image data.

The PTZ control unit 114 controls the pan drive unit 103, the tilt drive unit 104, and the lens drive unit 102 based on instructions transmitted from the system control unit 113, thereby controlling the panning, tilting, and zooming of the imaging apparatus 100. The PTZ control unit 114 also controls the lens drive unit 102 based on instructions transmitted from the system control unit 113, thereby controlling the focus value of the imaging apparatus 100. The storage unit 115 is a storage device such as a random-access memory (RAM) or a ROM, and an operating system (OS), various programs, and various kinds of data are loaded into the storage unit 115. The storage unit 115 is also used as a work area for the OS and various programs. Further, the storage unit 115 is used as a permanent storage area for the OS, various programs, and various kinds of data, and is also used as a temporary storage area for various kinds of data.

Figure 11:
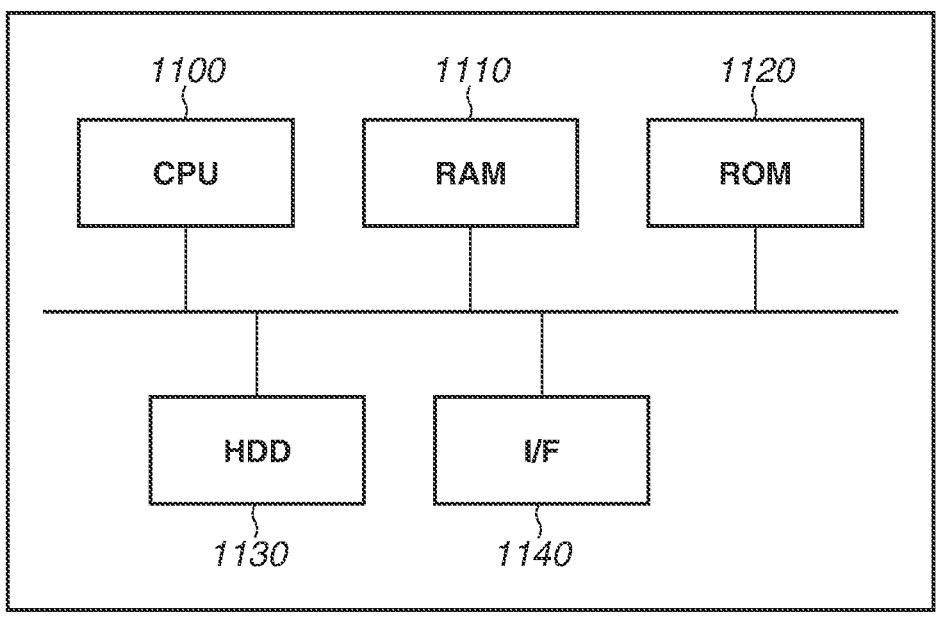
FIG. 11 is a block diagram illustrating an example of a hardware configuration of each of the imaging apparatus and the information processing apparatus.

The communication unit 116 communicates with the information processing apparatus 200 via an interface (I/F) 1140 to be described below with reference to FIG. 11. For example, the communication unit 116 transmits the image data of the images captured by the imaging apparatus 100 to the information processing apparatus 200 via the network 300. The communication unit 116 also transmits information (current information about the panning, tilting, and zooming) indicating the current imaging range of the imaging apparatus 100. The communication unit 116 also receives, from the information processing apparatus 200, a control command for controlling the imaging apparatus 100, and transmits the control command to the system control unit 113.

The system control unit 113 controls the entire operation of the imaging apparatus 100 based on processing executed by the CPU 1100 to be described below with reference to FIG. 11, and performs, for example, the following processing. The system control unit 113 analyzes the control command for controlling the imaging apparatus 100, which is transmitted from the information processing apparatus 200, and performs processing based on the control command. Further, the system control unit 113 issues, to the PTZ control unit 114, a control instruction to change at least one of the panning, tilting, and zooming. In the case of transmitting the image data generated by the image processing unit 112 to the information processing apparatus 200, the system control unit 113 adds, to the image data, information about the imaging time when the image data is captured and information about the imaging range.

The imaging range is defined by a pan value, a tilt value, and a zoom value of the imaging apparatus 100. The imaging apparatus 100 according to the present exemplary embodiment is configured to control the pan value, the tilt value, and the zoom value, but instead may control only one or two of the pan value, the tilt value, and the zoom value. The pan value represents an angle of the imaging direction (the optical axis) in the pan direction 105 of the imaging apparatus 100, for example, when an angle of one of drive ends of the pan drive unit 103 is 0°. The tilt value represents an angle of the imaging direction (the optical axis) in the tilt direction 106 of the imaging apparatus 100, for example, when an angle of one of drive ends of the tilt drive unit 104 is 0°. The zoom value of the imaging apparatus 100 in image capturing by the imaging apparatus 100 is calculated based on the focal length of the lens 101, and is represented by percentage sign (%).

The system control unit 113 includes a setting unit 117. The setting unit 117 sets a plurality of preset positions each determined by the pan value, the tilt value, and the zoom value. The setting unit 117 also sets order of the plurality of preset positions. Based on the set plurality of preset positions and the set order of the plurality of preset positions, the setting unit 117 further sets a plurality of routes each going through the preset positions. The plurality of routes includes a forward cyclic route (a first route), a round-trip route (a second route), and a reverse cyclic route (a third route). The term "forward cyclic route" (first route) refers to a route for controlling the imaging range to go through the set plurality of preset positions in a first direction. The term "round-trip route" (second route) refers to a round-trip route for controlling the imaging range to go back and forth between a first preset position as a start position and a second preset position as a halfway position among the set plurality of preset positions. The term "reverse cyclic route" (third route) refers to a route for controlling the imaging range to go through the set plurality of preset positions in a second direction different from the first direction. If the first direction corresponds to a clockwise direction, the second direction corresponds to a counterclockwise direction.

The setting unit 117 can also set a moving speed for controlling the imaging range between a certain preset position and another preset position. In the present exemplary embodiment, the setting unit 117 can also set an acceleration for controlling the imaging range between a certain preset position and another preset position.

The system control unit 113 also includes a calculation unit 118. The calculation unit 118 calculates a movement time taken to move the imaging range once along a selected route, based on the preset positions, the selected route, and the moving speeds and accelerations set between the preset positions.

Next, information processing to be performed by the information processing apparatus 200 according to the present exemplary embodiment will be described with reference to the functional blocks of the information processing apparatus 200 illustrated in FIG. 3. The functions of the information processing apparatus 200 are implemented as follows using the ROM 1120 and the CPU 1100 to be described below with reference to FIG. 11. The functions illustrated in FIG. 3 are implemented by the CPU 1100 of the information processing apparatus 200 executing computer programs stored in the ROM 1120 of the information processing apparatus 200.

A display control unit 201 causes the display 210 to display a setting screen. An operation reception unit 202 receives information about an operation performed by the user via the input device 220. In this case, for example, the display control unit 201 causes the display 210 to display a setting screen, and the operation reception unit 202 receives information about a user operation on a graphical user interface (GUI) displayed on the display 210. A system control unit 203 transmits a control command to the imaging apparatus 100 via a communication unit 204 in response to the user operation.

The communication unit 204 transmits the control command for controlling the imaging apparatus 100 to the imaging apparatus 100 via the I/F 1140 to be described below with reference to FIG. 11. The communication unit 204 receives the image data transmitted from the imaging apparatus 100 and also receives, from the imaging apparatus 100, a response to the control command transmitted from the information processing apparatus 200 to the imaging apparatus 100, and transmits the image data and the response to the system control unit 203.

The system control unit 203 generates a control command based on the user operation received by the operation reception unit 202, and transmits the control command to the imaging apparatus 100 via the communication unit 204. If the received image data is encoded image data, the system control unit 203 decodes the encoded image data to acquire images (images captured by the imaging apparatus 100), and the display control unit 201 causes the display 210 to display the images. A storage unit 205 is a storage device such as a RAM or a ROM, and an OS, various programs, and various kinds of data are loaded into the storage unit 205. The storage unit 205 is also used as a work area for the OS and various programs. Further, the storage unit 205 is used as a permanent storage area for the OS, various programs, and various kinds of data, and is also used as a temporary storage area for various kinds of data.

A setting window 400 to be generated by the system control unit 113 of the imaging apparatus 100 according to the present exemplary embodiment will be described below with reference to FIG. 4. In the present exemplary embodiment, the system control unit 113 of the imaging apparatus 100 generates information about the setting window 400, and the communication unit 116 outputs the information about the setting window 400 to the information processing apparatus 200. However, the present exemplary embodiment is not limited thereto. For example, the system control unit 203 of the information processing apparatus 200 may generate the information about the setting window 400. The display control unit 201 causes the display 210 to display the setting window 400 generated by the system control unit 113 (or the system control unit 203). If the system control unit 113 generates the information about the setting window 400, the information about the setting window 400 is transmitted to the information processing apparatus 200 via the communication unit 116, and the display control unit 201 causes the display 210 to display the setting window 400.

An image area 401 of the setting window 400 includes an image captured by the imaging apparatus 100. A route number area 402 stores settings for a plurality of preset positions. FIG. 4 illustrates an example where a route No. 1 selected on the route number area 402 is the current selection target, and a preset position A, a preset position B, and a preset position C are set for the route No. 1 in this order. If another number (e.g., a route No. 2) is selected on the route number area 402, other preset positions can be stored in association with the selected number. Each preset position is stored in association with the pan value, the tilt value, and the zoom value. The setting unit 117 sets each preset position based on a user operation, and the storage unit 115 stores information about each preset position (information about the pan value, the tilt value, and the zoom value corresponding to each preset position). In an order setting area 403, the order of the plurality of preset positions A, B, and C is set so that the preset position A is first, the preset position B is second, and the preset position C is third. The setting unit 117 can change (set) the order of the preset positions A, B, and C based on a user operation of rearranging the order of the preset positions A, B, and C in the order setting area 403. For example, assume a case where the preset position B is placed above the preset position A and the preset position C is placed below the preset position A in the order setting area 403 by a user operation. In this case, the setting unit 117 sets the order of the preset positions A, B, and C so that the preset position B is first, the preset position A is second, and the preset position C is third. In the example illustrated in FIG. 4, the setting unit 117 sets three preset positions, but instead may set four or more preset positions.

In a stop time area 404, the user can specify, for each preset position, a stop time after the imaging range has reached the preset position and before the imaging range is moved to the next preset position. For example, in the example illustrated in FIG. 4, five seconds are specified for the preset position B.

Information about the specified stop time is transmitted from the information processing apparatus 200 to the imaging apparatus 100. The setting unit 117 sets a stop time of five seconds for the preset position B. This processing is also performed for the preset position A and the preset position C in the same manner as described above. In the example illustrated in FIG. 4, zero seconds are set for the preset position A and 10 seconds are set for the preset position C.

In a specified section area 405, a section from a specified preset position to another preset position is displayed. FIG. 4 illustrates an example where "A-B" (a section between the preset positions A and B), "B-C" (a section between the preset positions B and C), and "C-A" (a section between the preset positions C and A) are displayed in this order from the top. In this case, the user can specify, in a moving speed area 406, a moving speed for controlling the imaging range in the corresponding section. For example, as illustrated in FIG. 4, moving speed information indicating "10" is set for the section between the preset positions A and B. In this case, if the imaging range is controlled in the section "preset position A=>preset position B", or if the imaging range is controlled in the section "preset position B=>preset position A", the imaging range is controlled based on a change speed of each of the pan value, the tilt value, and the zoom value associated with the moving speed information indicating "10". In the present exemplary embodiment, a maximum speed of "20" and a minimum speed of "1" can be set as moving speed information for controlling the panning, tilting, and zooming. The moving speeds from "1" to "20" are each associated with a pan/tilt speed (a change speed of each of the pan value and the tilt value) and a zoom speed (a change speed of the zoom value). For example, a pan/tilt speed of 10 (degrees/s) and a zoom speed of 10 (%/s) are associated with the moving speed information indicating "10". In an acceleration setting area 407, the user can specify an acceleration to be applied until the pan/tilt speed or zoom speed set in association with the corresponding section is reached. For example, as illustrated in FIG. 4, acceleration information indicating "1" is set for the section between the preset positions A and B. A value in a range from "1" to "3" can be set as acceleration information, and an acceleration for panning and tilting (hereinafter referred to as a pan/tilt acceleration) and an acceleration for zooming (hereinafter referred to as a zoom acceleration) are associated with each of pieces of acceleration information indicating "1", "2", and "3". For example, a pan/tilt acceleration of "3" (degrees/$s^2$) and a zoom acceleration of "1" (%/$s^2$) are associated with the acceleration information indicating "1". If the user sets "1" as the acceleration information, the setting unit 117 sets the pan/tilt acceleration of "3" (degrees/$s^2$) and the zoom acceleration of "1" (%/$s^2$).

In a route selection area 408, the user can select one of a forward cyclic route icon 409, a reverse cyclic route icon 410, and a round-trip route icon 411. FIG. 4 illustrates an example where the forward cyclic route icon 409 is selected. As illustrated in FIG. 4, if an icon corresponding to a certain route is selected in a state where preset positions are set, information about each of the set preset positions and information about the certain route are transmitted from the information processing apparatus 200 to the imaging apparatus 100. Assume a case where the order of the preset positions A, B, and C is set so that the preset position A is first, the preset position B is second, and the preset position C is third as illustrated in FIG. 4. In this case, the storage unit 115 of the imaging apparatus 100 stores information about each of the preset positions A, B, and C (the pan value, the tilt value, and the zoom value corresponding to each of the preset positions A, B, and C) and information about the order of the preset positions A, B, and C.

Figure 5A:
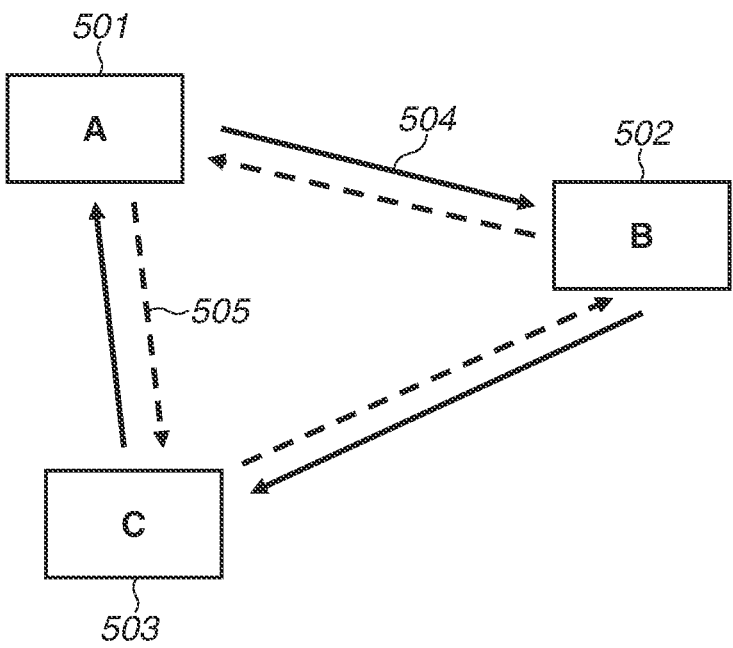
FIGS. 5A and 5B are diagrams each illustrating an example of imaging range control.

If the forward cyclic route icon 409 is selected, information indicating that the forward cyclic route is selected is transmitted from the information processing apparatus 200 to the imaging apparatus 100. As illustrated in FIG. 5A, the setting unit 117 sets a route "preset position A 501=>preset position B 502=>preset position C 503=>preset position A 501=> . . . (repeated)" as indicated by a solid arrow 504. In this case, if the user presses a playback/stop button 412 on the setting window 400 displayed on the display 210 to issue a playback instruction, a control command including information about the playback instruction is transmitted from the information processing apparatus 200 to the imaging apparatus 100. Upon acquisition of the control command, the PTZ control unit 114 of the imaging apparatus 100 controls the imaging range to go through the preset positions A, B, and C in the first direction (the direction indicated by the solid arrow 504), which corresponds to the clockwise direction, along the set route indicated by the solid arrow 504.

One round of the forward cyclic route illustrated in FIG. 5A corresponds to a route that starts from the preset position A 501 as the start position and returns to the preset position A 501, such as a route "preset position A 501=>preset position B 502=>preset position C 503=>preset position A 501". If the forward cyclic route icon 409 is selected, the calculation unit 118 calculates the movement time taken to move the imaging range once along the forward cyclic route as follows. The calculation unit 118 first calculates a movement time for the section "preset position A 501=>preset position B 502". At this time, the calculation unit 118 identifies the pan/tilt speed and zoom speed corresponding to the section from the preset position A 501 to the preset position B 502 based on the moving speed information set for the section between the preset positions A 501 and B 502. The calculation unit 118 also identifies the pan/tilt acceleration and zoom acceleration corresponding to the section from the preset position A 501 to the preset position B 502 based on the acceleration information set for the section between the preset positions A 501 and B 502. The calculation unit 118 then identifies a difference value (a distance in the pan direction) between the pan value of the preset position A 501 and the pan value of the preset position B 502. The calculation unit 118 calculates a pan movement time, which is the time taken to reach from the preset position A 501 to the preset position B 502 in the pan direction, based on the distance in the pan direction, the pan/tilt speed, and the pan/tilt acceleration. A known calculation method may be used to calculate the time taken to move the distance based on the distance, speed, and acceleration. Similarly, the calculation unit 118 identifies a difference value (a distance in the tilt direction) between the tilt value of the preset position A 501 and the tilt value of the preset position B 502. The calculation unit 118 calculates a tilt movement time, which is the time taken to reach from the preset position A 501 to the preset position B 502 in the tilt direction, based on the distance in the tilt direction, the pan/tilt speed, and the pan/tilt acceleration. Similarly, the calculation unit 118 identifies a difference value (a distance in the zoom direction) between the zoom value of the preset position A 501 and the zoom value of the preset position B 502. The calculation unit 118 calculates a zoom movement time, which is the time taken to reach from the preset position A 501 to the preset position B 502 in the zoom direction, based on the distance in the zoom direction, the zoom speed, and the zoom acceleration. The calculation unit 118 calculates the longest one of the pan movement time, the tilt movement time, and the zoom movement time, which are calculated for the section "preset position A 501=>preset position B 502", as the movement time for the section.

As described above, the calculation unit 118 calculates the movement time for the section "preset position A 501=>preset position B 502". Similarly, the calculation unit 118 calculates a movement time for the section "preset position B 502=>preset position C 503" and a movement time for the section "preset position C 503=>preset position A 501". The calculation unit 118 calculates the sum of the movement times calculated for the sections, as the movement time taken to move the imaging range once along the forward cyclic route. As illustrated in FIG. 4, if the stop time is set for each preset position, the calculation unit 118 calculates the movement time taken to move the imaging range once along the forward cyclic route as follows. The calculation unit 118 adds up the sum of the movement times calculated for the sections and the sum of the stop times set for the preset positions, as the movement time taken to move the imaging range once along the forward cyclic route.

Figure 4:
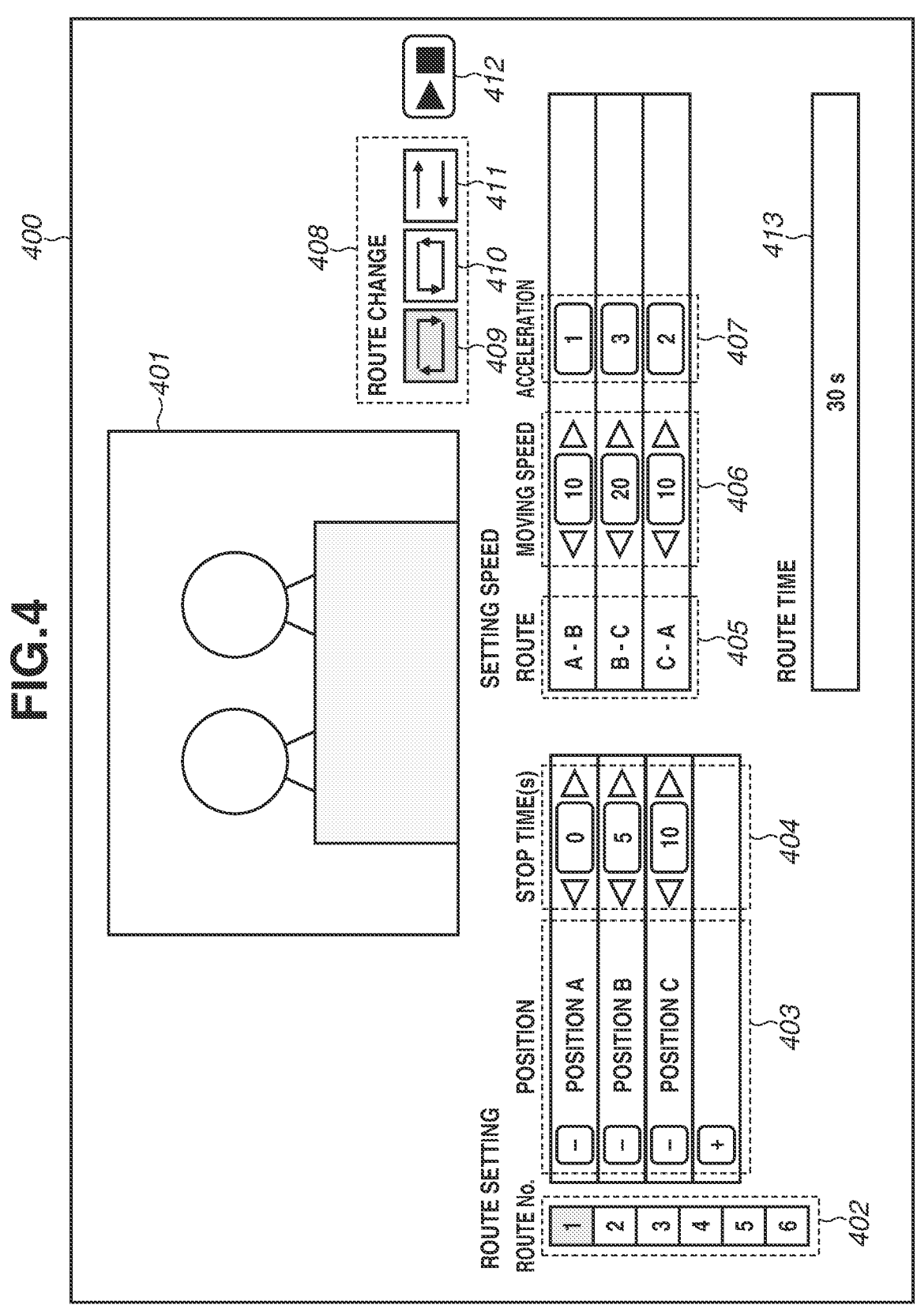
FIG. 4 is a diagram illustrating an example of a setting window.

Next, assume a case where, as illustrated in FIG. 4, the order of the preset positions A, B, and C is set so that the preset position A is first, the preset position B is second, and the preset position C is third, and the reverse cyclic route icon 410 is selected. In this case, as illustrated in FIG. 5A, the setting unit 117 sets a route "preset position A 501=>preset position C 503=>preset position B 502=>preset position A 501=> . . . (repeated)" as indicated by a dashed arrow 505. In this case, if the user presses the playback/stop button 412 on the setting window 400 displayed on the display 210 to issue a playback instruction, a control command including information about the playback instruction is transmitted from the information processing apparatus 200 to the imaging apparatus 100. Upon acquisition of the control command, the PTZ control unit 114 of the imaging apparatus 100 controls the imaging range to go through the preset positions A, C, and B in the second direction (the direction indicated by the dashed arrow 505), which corresponds to the counterclockwise direction, along the set route indicated by the dashed arrow 505.

One round of the reverse cyclic route illustrated in FIG. 5A corresponds to a route that starts from the preset position A 501 as the start position and returns to the preset position A 501, such as a route "preset position A 501=>preset position C 503=>preset position B 502=>preset position A 501". The calculation of the movement time taken to move the imaging range once along the reverse cyclic route by the calculation unit 118 is similar to the calculation of the movement time taken to move the imaging range once along the forward cyclic route described above. More specifically, the calculation unit 118 calculates a movement time for the section "preset position A 501=>preset position C 503", a movement time for the section "preset position C 503=>preset position B 502", and a movement time for the section "preset position B 502=>preset position A 501". If the stop times are not set, the calculation unit 118 calculates the sum of the movement times calculated for the sections, as the movement time taken to move the imaging range once along the reverse cyclic route. If the stop times are set, the calculation unit 118 adds up the sum of the movement times calculated for the sections and the sum of the stop times set for the preset positions, as the movement time taken to move the imaging range once along the reverse cyclic route.

Figure 5B:
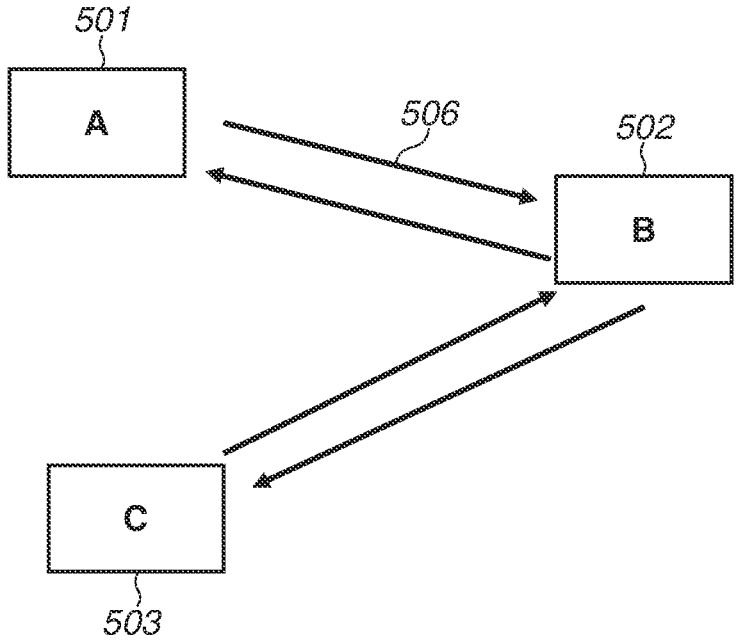

Next, assume a case where, as illustrated in FIG. 4, the order of the preset positions A, B, and C is set so that the preset position A is first, the preset position B is second, and the preset position C is third, and the round-trip route icon 411 is selected. In this case, the setting unit 117 sets a route "preset position A 501=>preset position B 502=>preset position C 503=>preset position B 502=>preset position A 501=>preset position B 502 . . . (repeated)" as indicated by an arrow 506 as illustrated in FIG. 5B. In this case, if the user presses the playback/stop button 412 on the setting window 400 displayed on the display 210 to issue a playback instruction, a control command including information about the playback instruction is transmitted from the information processing apparatus 200 to the imaging apparatus 100. Upon acquisition of the control command, the PTZ control unit 114 of the imaging apparatus 100 performs the following control processing. More specifically, the PTZ control unit 114 controls the imaging range to go back and forth between the preset position A 501 (the first preset position)

as the start position and the preset position C 503 (the second preset position) as the halfway position through the preset position B along the set route indicated by the arrow 506.

In this case, one round of the round-trip route illustrated in FIG. 5B corresponds to a route that starts from the preset position A 501 as the start position and returns to the preset position A 501, such as a route "preset position A=>preset position B=>preset position C=>preset position B=>preset position A".

The calculation of the movement time taken to move the imaging range once along the round-trip route by the calculation unit 118 is similar to the calculation of the movement time taken to move the imaging range once along the forward cyclic route described above. More specifically, the calculation unit 118 calculates the movement time for the section "preset position A=>preset position B", the movement time for the section "preset position B=>preset position C", the movement time for the section "preset position C=>preset position B", and the movement time for the section "preset position B=>preset position A". If the stop times are not set, the calculation unit 118 calculates the sum of the movement times calculated for the sections, as the movement time taken to move the imaging range once along the round-trip route. If the stop times are set, the calculation unit 118 adds up the sum of the movement times calculated for the sections and the sum of the stop times at the preset positions on the round-trip route, as the movement time taken to move the imaging range once along the round-trip route.

Figure 6:
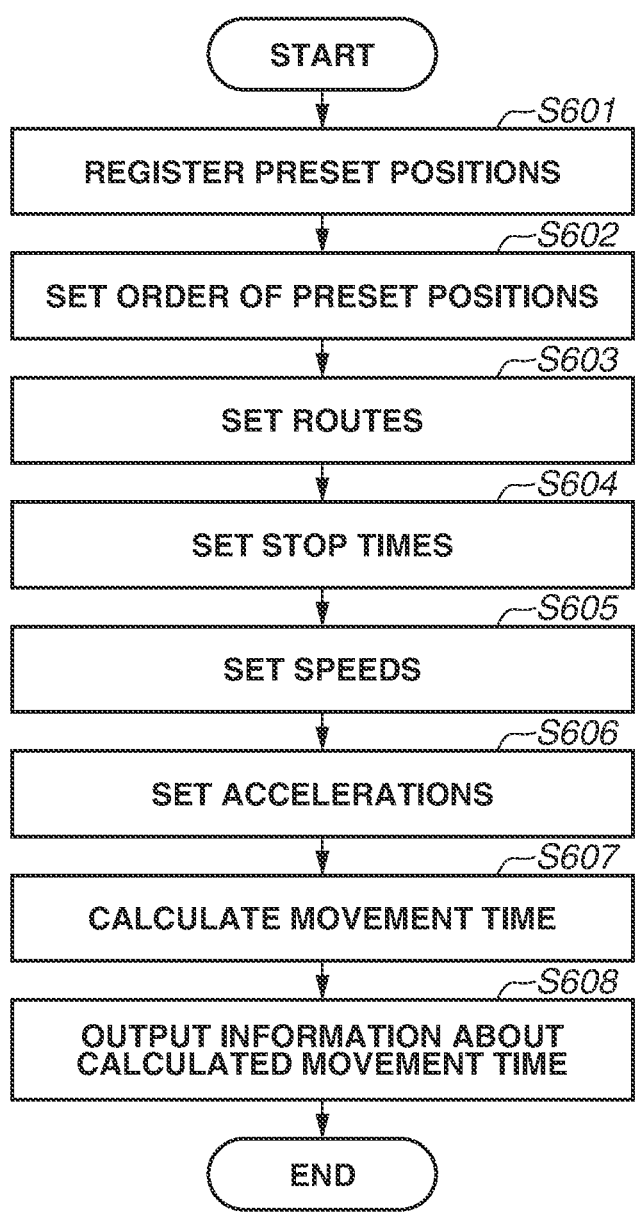
FIG. 6 is a flowchart illustrating a procedure for movement time calculation processing.

Next, control processing to be performed by the imaging apparatus 100 according to the present exemplary embodiment will be described with reference to a flowchart illustrated in FIG. 6. The processing in the flowchart illustrated in FIG. 6 is implemented by the CPU 1100 of the imaging apparatus 100 executing computer programs stored in the ROM 1120 of the imaging apparatus 100.

In step S601, the setting unit 117 registers a plurality of preset positions based on a user operation. In step S602, the setting unit 117 sets the order of the plurality of preset positions based on a user operation. In step S603, the setting unit 117 sets the forward cyclic route, the round-trip route, and the reverse cyclic route based on the plurality of preset positions and the order of the preset positions. In step S604, the setting unit 117 sets the stop times for the preset positions based on a user operation of specifying the stop times on the setting window 400 displayed on the display 210. Information about the stop times set in the stop time area 404 of the setting window 400 displayed on the display 210 is transmitted from the information processing apparatus 200 to the imaging apparatus 100, and is stored in the storage unit 115. In step S605, the setting unit 117 sets the speeds for controlling the imaging range in the sections between the preset positions, based on a user operation of specifying speed information on the setting window 400 displayed on the display 210. In step S606, the setting unit 117 sets the accelerations for the sections between the preset positions based on a user operation of specifying acceleration information on the setting window 400 displayed on the display 210. In step S607, the calculation unit 118 calculates the time taken to move the imaging range once along a selected route, based on the selected route, the speeds (the pan/tilt speeds and the zoom speeds), and the accelerations (the pan/tilt accelerations and the zoom accelerations). In step S608, the system control unit 113 transmits information about the calculated movement time to the information processing apparatus 200. The display control unit 201 of the information processing apparatus 200 causes the display 210 to display the information about the calculated movement time as indicated by movement time (route time) information 413 included in the setting window 400 illustrated in FIG. 4.

As described above, in the present exemplary embodiment, the movement time taken to move the imaging range once along a selected route can be calculated and displayed.

In a second exemplary embodiment, a time taken to control the imaging range to move once along a selected route is calculated. In particular, the time is calculated using an easing setting indicating a degree of change in acceleration from a motion start to a motion end in controlling the imaging range to move from a certain preset position to another preset position. In the second exemplary embodiment, differences from the first exemplary embodiment will be mainly described, and components and processing in the second exemplary embodiment that are the same or similar to those in the first exemplary embodiment are denoted by the same reference numerals, and repeated descriptions thereof will be omitted.

The setting unit 117 according to the present exemplary embodiment can set easing for controlling the imaging range to move from a certain preset position to another preset position. How to set the easing will be described with reference to FIG. 7.

Figure 7:
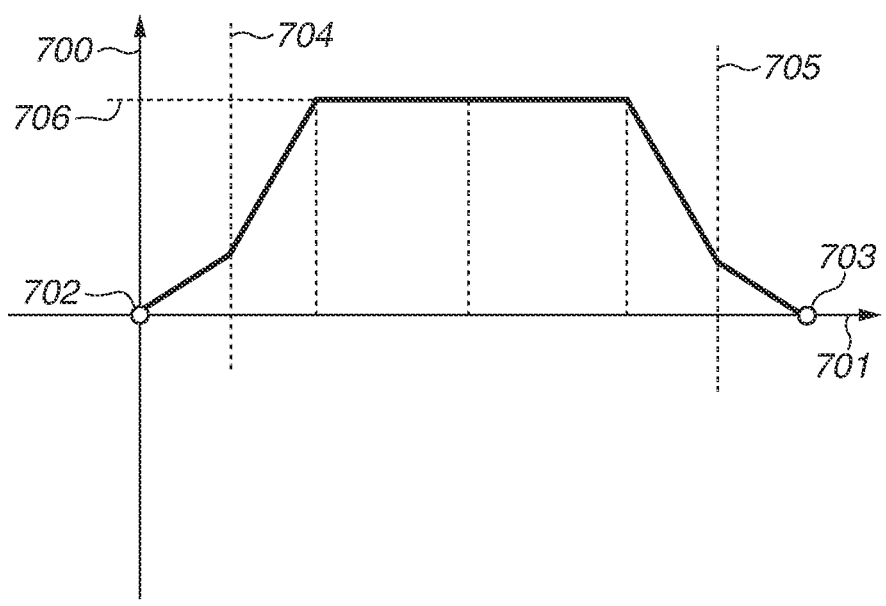
FIG. 7 is a graph illustrating an example of easing setting.

FIG. 7 is a graph illustrating a change in acceleration. A vertical axis 700 represents a change speed of the pan value, and a horizontal axis 701 represents a preset moving distance of the pan value. A position 702 on the horizontal axis 701 corresponds to the pan value of the preset position A 501 illustrated in FIG. 5A, and a position 703 on the horizontal axis 701 corresponds to the pan value of the preset position B 502 illustrated in FIG. 5A. Change positions (acceleration change points) 704 and 705 indicate change points of the pan acceleration, and a speed 706 indicates the speed of the pan value set between the preset position A 501 and the preset position B 502. The movement of the imaging range is started from the preset position A corresponding to the position 702 and the tilt (i.e., the acceleration) is changed at the acceleration change point 704 that is located at a certain distance from the start position. Also when the imaging range is moved toward the position 703, the deceleration is started after the imaging range is moved a certain distance at the speed 706, and the acceleration is changed at the acceleration change point 705. The user can set, for example, one of values "1" and "2" for the easing setting. As the number of set values increases, the acceleration change points described above with reference to FIG. 7 can be varied. While FIG. 7 illustrates the pan value, the same applies to the tilt value and the zoom value.

Next, a setting window 800 generated by the system control unit 113 of the imaging apparatus 100 will be described with reference to FIG. 8. In the present exemplary embodiment, the system control unit 113 of the imaging apparatus 100 generates information about the setting window 800, but instead the system control unit 203 of the information processing apparatus 200 may generate information about the setting window 800. The display control unit 201 causes the display 210 to display the setting window 800 generated by the system control unit 113 (or the system control unit 203). If information about the setting window 800 is generated by the system control unit 113, the information about the setting window 800 is transmitted to the information processing apparatus 200 via the communication unit 116, and the display control unit 201 causes the display 210 to display the setting window 800.

Figure 8:
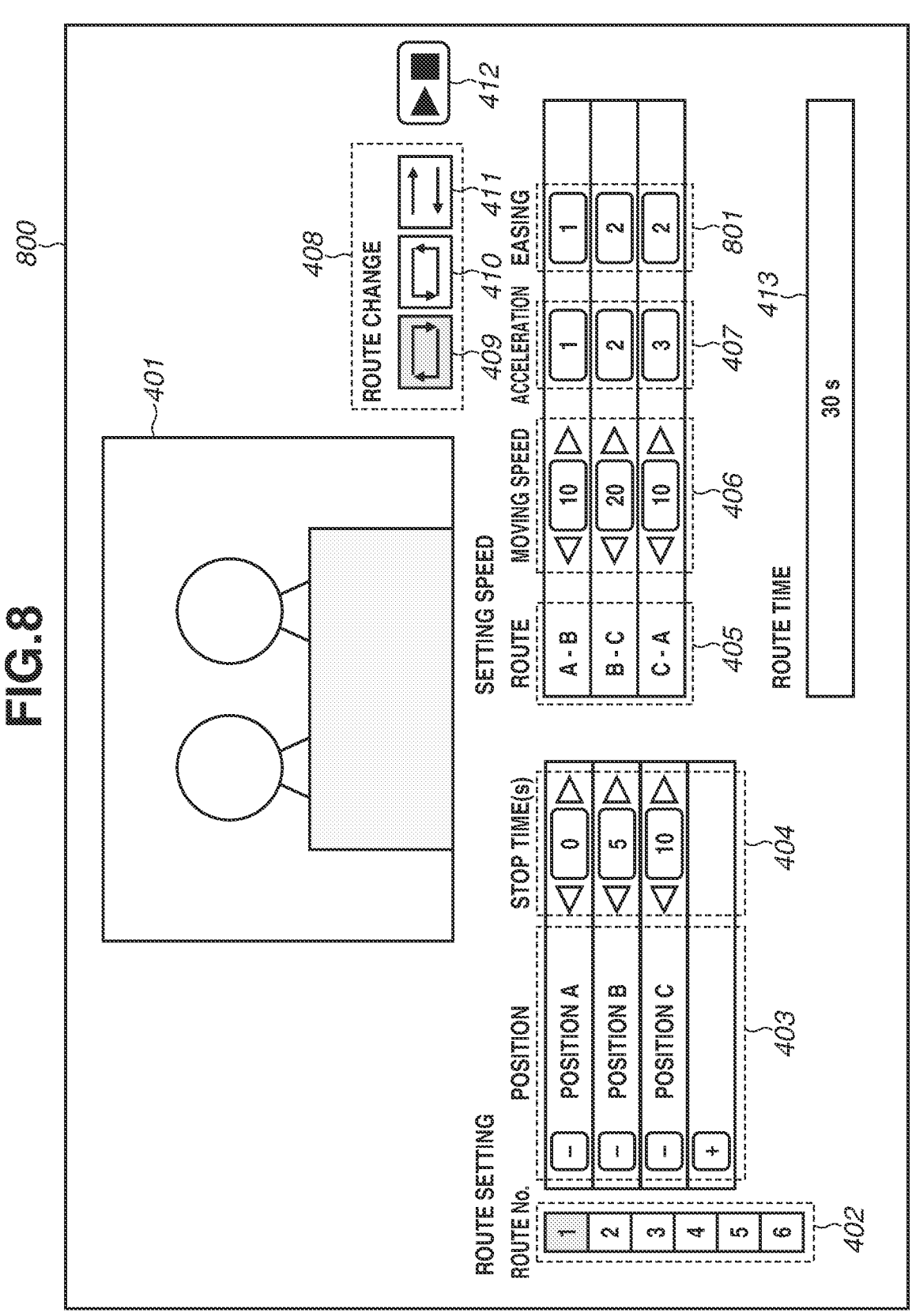
FIG. 8 is a diagram illustrating another example of the setting window.

The setting window 800 illustrated in FIG. 8 includes information about an easing setting 801, in addition to the information included in the setting window 400 illustrated in FIG. 4. The user can input a desired value for the easing setting 801. In the example illustrated in FIG. 8, the easing setting 801 is set to "1" for the section between the preset positions A and B, which indicates that there are no acceleration change points. The easing setting 801 is set to "2" for the section between the preset positions B and C and the section between the preset positions C and A, which indicates that there is one acceleration change point as illustrated in FIG. 7. The accelerations derived from the acceleration information set in the acceleration setting area 407 and the value set for the easing setting 801 will now be described with reference to FIGS. 9A and 9B. As illustrated in the table of FIG. 9A, if the easing setting 801 is set to "1", there is no acceleration change point unlike FIG. 7 and thus if the acceleration information indicates "1", the acceleration information indicating "1" is directly output. As illustrated in FIG. 9B, the acceleration information indicating "1" is associated with the pan/tilt acceleration of "1" (degrees/s$^2$) and the zoom acceleration of "1" (%/s$^2$). Accordingly, as illustrated in FIG. 8, if, for the section between the preset positions A and B, the easing setting 801 is set to "1" and the acceleration information is set to "1" in the acceleration setting area 407, the accelerations are set as follows. The setting unit 117 sets "1" (degrees/s$^2$) as the pan/tilt acceleration before reaching the pan/tilt speed associated with the moving speed of "10", and sets "1" (%/s$^2$) as the zoom acceleration before reaching the zoom speed associated with the moving speed of "10". If, for the section between the preset positions B and C, the moving speed is set to "20", the acceleration information is set to "2", and the easing setting 801 is set to "2" as illustrated in FIG. 8, the accelerations for this section are derived as follows. The setting unit 117 refers to the table of FIG. 9A to derive acceleration information (2, 3) based on the acceleration information set to "2" and the easing setting 801 set to "2". As illustrated in FIG. 7, the acceleration information (2, 3) indicates that the acceleration information indicating "2" is applied until the acceleration change point 704 is reached and the acceleration information indicating "3" is applied until the speed 706 is reached after the acceleration change point 704 is reached. More specifically, in this case, as illustrated in FIG. 9B, the setting unit 117 sets a pan/tilt acceleration of "5" (degrees/s$^2$) and a zoom acceleration of "5" (%/s$^2$) corresponding to the acceleration information indicating "2" until the acceleration change point 704 is reached. Further, as illustrated in FIG. 9B, the setting unit 117 sets a pan/tilt acceleration of "10" (degrees/s$^2$) and a zoom acceleration of "10" (%/s$^2$) corresponding to the acceleration information indicating "3" until the speed 706 is reached after the acceleration change point 704 is reached.

Figure 10:
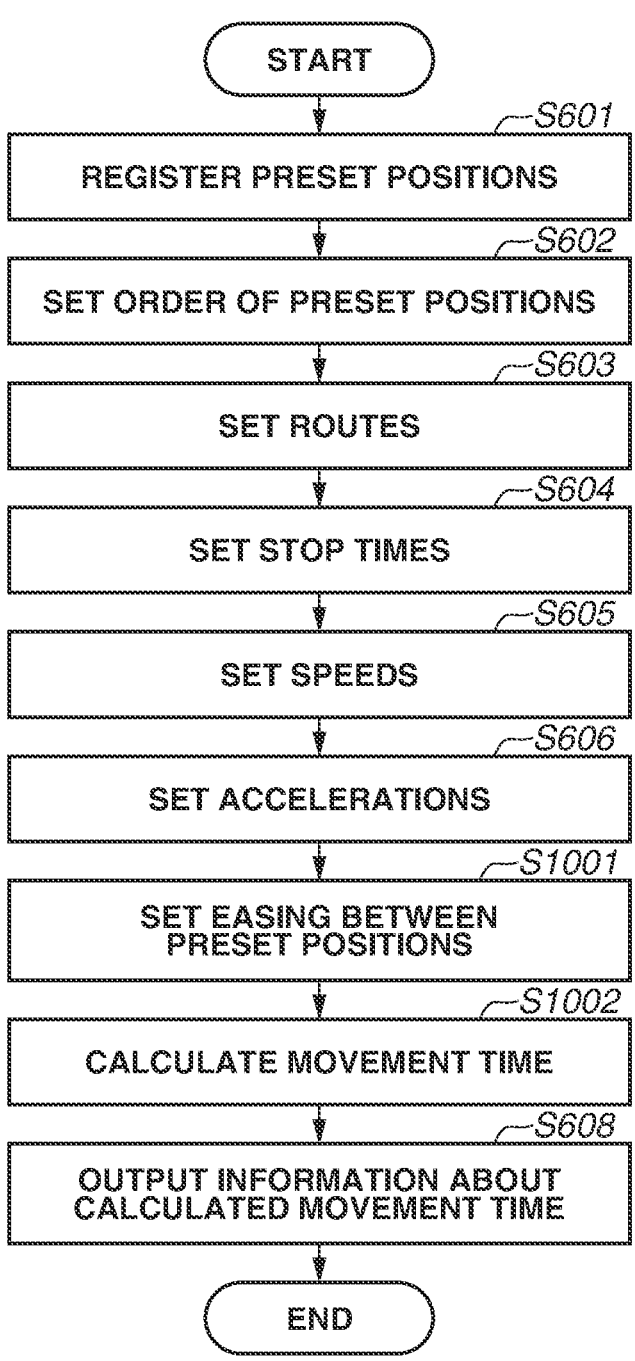
FIG. 10 is a flowchart illustrating another procedure for the movement time calculation processing.

Next, processing according to the present exemplary embodiment will be described with reference to a flowchart illustrated in FIG. 10. The processing in the flowchart illustrated in FIG. 10 is implemented by the CPU 1100 of the imaging apparatus 100 executing computer programs stored in the ROM 1120 of the imaging apparatus 100.

Steps S601 to S606 are similar to those described above with reference to FIG. 6, and thus descriptions thereof will be omitted. In step S1001, the setting unit 117 sets easing between the preset positions based on a user operation. In step S1002, the calculation unit 118 calculates the movement time taken to move the imaging range once along a selected route, based on the plurality of preset positions, the order of the preset positions, the selected route, the stop times, the speeds, the accelerations, and the easing setting 801. In step S608, the system control unit 113 transmits information about the calculated movement time to the information processing apparatus 200. The display control unit 201 of the information processing apparatus 200 causes the display 210 to display the information about the calculated movement time as indicated by the movement time information 413 included in the setting window 400 (800) illustrated in FIG. 4 (8).

As described above, according to the present exemplary embodiment, it is possible to calculate and display the time taken to move the imaging range once along the selected route.

Next, an example of a hardware configuration of the imaging apparatus 100 for implementing the functions according to the exemplary embodiments will be described with reference to FIG. 11. While the hardware configuration of the imaging apparatus 100 is described below, the information processing apparatus 200 can also be implemented by a hardware configuration similar to that of the imaging apparatus 100.

The imaging apparatus 100 according to the present exemplary embodiment includes the CPU 1100, a RAM 1110, the ROM 1120, a hard disk drive (HDD) 1130, and the I/F 1140.

The CPU 1100 controls the entire operation of the imaging apparatus 100. The RAM 1110 temporarily stores computer programs to be executed by the CPU 1100. The RAM 1110 provides a work area for the CPU 1100 to execute processing. The RAM 1110 functions as, for example, a frame memory or a buffer memory.

The ROM 1120 stores programs to be executed by the CPU 1100 to control the imaging apparatus 100. The HDD 1130 is a storage device that stores image data and the like.

The I/F 1140 communicates with an external apparatus according to Transmission Control Protocol/Internet Protocol (TCP/IP), HyperText Transfer Protocol (HTTP), or the like via the network 300.

While the exemplary embodiments have been described above using an example where the CPU 1100 executes processing, at least a part of the processing executed by the CPU 1100 may be executed by dedicated hardware. For example, processing of reading out a program code from the ROM 1120 and loading the program code into the RAM 1110 may be executed by a direct memory access (DMA) functioning as a transfer device.

The exemplary embodiments of the present disclosure can also be implemented by processing in which one or more processors read out a program for implementing one or more functions according to the above-described exemplary embodiments and execute the program. The program may be supplied to a system or apparatus including the one or more processors via a network or storage medium.

The exemplary embodiments of the present disclosure can also be implemented by a circuit (e.g., an application-specific integrated circuit (ASIC)) for implementing one or more functions according to the exemplary embodiments described above. The components of the imaging apparatus 100 may be implemented by the hardware configuration illustrated in FIG. 11, or may be implemented by software.

The above-described exemplary embodiments are merely specific examples for carrying out the present disclosure. The technical scope of the present disclosure should not be interpreted in a limited way due to these embodiments. The present disclosure can be carried out in various forms without departing from the technical idea or the main features thereof. For example, any combination of the exemplary embodiments is also included in the disclosed contents of the present disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-174742, filed Oct. 31, 2022, which is hereby incorporated by reference herein in its entirety.

What is claimed is:

1. A control apparatus comprising:
   at least one processor; and
   at least one memory that is in communication with the at least one processor, wherein the at least one memory stores instructions for causing the at least one processor and the at least one memory to:
   generate information about a setting window for setting a plurality of preset positions each associated with a pan value, a tilt value, and a zoom value of an imaging unit;
   output the information about the setting window in order to cause a display to display the setting window;
   set the plurality of preset positions and an order of the plurality of preset positions based on a user operation on the setting window;
   calculate a movement time taken to move an imaging range of the imaging unit once along a selected route, based on the plurality of preset positions and the selected route, wherein the selected route is selected by a user from among a plurality of routes for controlling the imaging range; and control the display to display the movement time on the setting window, wherein the movement time is calculated based on a degree of change in acceleration from a motion start to a motion end in controlling the imaging range along the selected route.

2. The control apparatus according to claim 1, wherein the plurality of routes includes a first route for controlling the imaging range to go through the plurality of preset positions in a first direction, a second route for controlling the imaging range to go back and forth between a first preset position as a start position and a second preset position as a halfway position among the plurality of preset positions, and a third route for controlling the imaging range to go through the plurality of preset positions in a second direction different from the first direction.

3. The control apparatus according to claim 1, wherein the instructions further cause the at least one processor and the at least one memory to calculate the movement time based on information about a respective stop time set for each of the plurality of preset positions.

4. The control apparatus according to claim 1, wherein the instructions further cause the at least one processor and the at least one memory to calculate the movement time based on information about a moving speed set for a section between two preset positions of the plurality of preset positions.

5. The control apparatus according to claim 1, wherein the movement time is calculated based on the longest one of a pan movement time, a tilt movement time, and a zoom movement time.

6. The control apparatus according to claim 5, wherein the pan movement time is calculated based on a distance in a pan direction, a pan/tilt speed, and a pan/tilt acceleration, wherein the tilt movement time is calculated based on a distance in a tilt direction, a pan/tilt speed, and a pan/tilt acceleration, and wherein the zoom movement time is calculated based on a distance in a zoom direction, a zoom speed, and a zoom acceleration.

7. The control apparatus according to claim 1, wherein each route of the plurality of routes defines a respective order of the plurality of preset positions.

8. The control apparatus according to claim 7, wherein the instructions further cause the at least one processor and the at least one memory to:

receive a selection of a second selected route from among the plurality of routes, wherein the respective order of the plurality of preset positions that is defined by the second selected route is different from the respective order of the plurality of preset positions that is defined by the selected route;

calculate a second movement time taken to move the imaging range of the imaging unit once along the second selected route, based on the plurality of preset positions and the second selected route; and control the display to replace the movement time on the setting window with the second movement time.

9. A control method for a control apparatus, the control method comprising:

generating, by the control apparatus, information about a setting window for setting a plurality of preset positions each associated with a pan value, a tilt value, and a zoom value of an imaging unit;

controlling, by the control apparatus, a display to display the setting window;

setting, by the control apparatus, the plurality of preset positions and an order of the plurality of preset positions based on a user operation on the setting window;

calculating, by the control apparatus, a movement time taken to move an imaging range of the imaging unit once along a selected route, based on the plurality of preset positions and the selected route, wherein the selected route is selected by a user from among a plurality of routes for controlling the imaging range; and controlling, by the control apparatus, the display to display the movement time on the setting window, wherein the movement time is calculated based on a degree of change in acceleration from a motion start to a motion end in controlling the imaging range along the selected route.

10. A non-transitory computer-readable storage medium storing a computer program for causing a computer to perform a control method comprising:

generating information about a setting window for setting a plurality of preset positions each associated with a pan value, a tilt value, and a zoom value of an imaging unit;

controlling a display to display the setting window;

setting the plurality of preset positions and an order of the plurality of preset positions based on a user operation on the setting window;

calculating a movement time taken to move an imaging range of the imaging unit once along a selected route, based on the plurality of preset positions and the selected route, wherein the selected route is selected by a user from among a plurality of routes for controlling the imaging range; and controlling the display to display the movement time on the setting window, wherein the movement time is calculated based on a degree of change in acceleration from a motion start to a motion end in controlling the imaging range along the selected route.

* * * * *